(12) United States Patent
Blasinski et al.

(10) Patent No.: US 8,676,423 B2
(45) Date of Patent: Mar. 18, 2014

(54) METHOD FOR OPERATING A VEHICLE WITH AN INTERNAL COMBUSTION ENGINE AND A GENERATOR

(75) Inventors: Boris Blasinski, Ingolstadt (DE); Rene Kasteneder, Münchsmünster (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/700,621

(22) PCT Filed: May 12, 2011

(86) PCT No.: PCT/EP2011/002343
§ 371 (c)(1),
(2), (4) Date: Nov. 28, 2012

(87) PCT Pub. No.: WO2011/151011
PCT Pub. Date: Dec. 8, 2011

(65) Prior Publication Data
US 2013/0073135 A1    Mar. 21, 2013

(30) Foreign Application Priority Data
May 29, 2010    (DE) .......................... 10 2010 022 018

(51) Int. Cl.
*B60L 9/00*    (2006.01)

(52) U.S. Cl.
USPC ... 701/22; 701/1; 701/54; 701/55; 180/65.21; 180/65.28

(58) Field of Classification Search
USPC ................. 701/1, 22, 54, 55; 180/165, 65.21, 180/65.28; 318/139
See application file for complete search history.

(56) References Cited

U.S. PATENT DOCUMENTS

| 5,788,004 | A | 8/1998 | Friedmann et al. |
| 5,820,172 | A | 10/1998 | Brigham et al. |
| 6,158,541 | A * | 12/2000 | Tabata et al. .................. 180/165 |
| 6,469,403 | B2 | 10/2002 | Omata et al. |
| 6,504,327 | B2 | 1/2003 | Omata et al. |
| 7,019,472 | B2 | 3/2006 | Kayukawa et al. |

(Continued)

FOREIGN PATENT DOCUMENTS

| DE | 195 05 431 B4 | 8/1996 |
| DE | 101 16 314 A1 | 11/2001 |

(Continued)

OTHER PUBLICATIONS

International Search Report issued by the European Patent Office with regard to the corresponding International Patent Application No. PCT/EP2011/002343.

*Primary Examiner* — John R Olszewski
*Assistant Examiner* — Truc M Do
(74) *Attorney, Agent, or Firm* — Henry M. Feiereisen LLC

(57) ABSTRACT

It is known to charge the battery in a hybrid vehicle with a generator such that the efficiency (electric power per fuel quantity) is maximal. It is known that the consumption-optimized mode can be terminated in order to charge the battery faster. A mathematical calculation rule is applied to the optimal value of the efficiency in order to determine a value for an efficiency which then indicates a load point shift for the internal combustion engine. In particular, constant percentages can be used which are applied to the inverse efficiency.

8 Claims, 1 Drawing Sheet

(56) References Cited

U.S. PATENT DOCUMENTS

| | | |
|---|---|---|
| 7,104,347 B2 * | 9/2006 | Severinsky et al. ........ 180/65.23 |
| 7,560,902 B2 * | 7/2009 | Unger ........................... 320/141 |
| 8,020,651 B2 | 9/2011 | Zillmer et al. |
| 8,054,039 B2 * | 11/2011 | Bauerle et al. ................ 320/109 |
| 2002/0023790 A1 * | 2/2002 | Hata et al. .................... 180/65.3 |
| 2004/0060751 A1 | 4/2004 | Frank |
| 2004/0074682 A1 | 4/2004 | Fussey et al. |
| 2006/0009884 A1 * | 1/2006 | Mensler et al. .................... 701/1 |
| 2006/0061322 A1 * | 3/2006 | Yamazaki et al. ............. 320/104 |
| 2007/0034425 A1 * | 2/2007 | Roessel ........................ 180/65.2 |
| 2009/0150016 A1 * | 6/2009 | Hung et al. ...................... 701/22 |
| 2009/0314563 A1 * | 12/2009 | Burkholder .............. 180/65.265 |
| 2011/0017534 A1 | 1/2011 | Kaltenbach et al. |

FOREIGN PATENT DOCUMENTS

| | | |
|---|---|---|
| DE | 101 16 448 A1 | 11/2001 |
| DE | 103 46 720 A1 | 5/2004 |
| DE | 103 02 860 A1 | 8/2004 |
| DE | 10 2004 055 128 A1 | 6/2006 |
| DE | 10 2005 044 268 A1 | 3/2007 |
| DE | 601 30 484 T2 | 6/2008 |
| DE | 10 2008 008 238 A1 | 8/2008 |
| DE | 10 2007 038 585 A1 | 3/2009 |
| DE | 10 2008 042 228 A1 | 4/2010 |
| FR | 2 935 123 A1 | 2/2010 |

* cited by examiner

METHOD FOR OPERATING A VEHICLE WITH AN INTERNAL COMBUSTION ENGINE AND A GENERATOR

CROSS-REFERENCES TO RELATED APPLICATIONS

This application is the U.S. National Stage of International Application No. PCT/EP2011/002343, filed May 12, 2011, which designated the United States and has been published as International Publication No. WO 2011/151011 and which claims the priority of German Patent Application, Serial No. 10 2010 022 018.3, filed May 29, 2010, pursuant to 35 U.S.C. 119(a)-(d).

BACKGROUND OF THE INVENTION

The invention relates to a method for operating a vehicle having an internal combustion engine with a generator, as is known from DE 10 2008 008 238 A1.

When hybrid vehicles are operated using the combustion engine, the electric drive is operated in the reverse direction as a generator to generate electric current for charging a battery; the battery is then used to power the electric drive, when the internal combustion engine is switched off.

Electrical current is usually produced by the internal combustion engine which generates additional torque in addition to the actual torque used to drive the motor vehicle. In other words, a partial torque of the total torque generated on a shaft during operation of the internal combustion engine is used to generate electric current from the generator. In principle, it is desirable to consume as little fuel as possible for the generation of the electric current. Therefore, preferably a first mode exists in which the partial torque is set so that the efficiency is adjusted to an optimum (maximum) value. The efficiency is defined as the work provided by the electric current per quantity of fuel. It is known from DE 10 2008 008 238 A1, that more than one charging or discharging function may exist, which may be selected by a control device. An additional operating range exists besides the operating range with the most favorable efficiency. The input variable, which defines this additional operating range, is an actual difference between a target charge of the battery of the hybrid vehicle and the actual charge. The charge is expressed as a percentage in relation to a maximum capacity.

Therefore, a second mode exists in addition to the first mode in which the efficiency is set to an additional value (which is different from the maximum value). To this date, the absolute power and not the efficiency was used as guiding principle: namely, the second mode is preferably implemented when the battery needs to be charged quickly. In this case, the absolute value of the work performed is important. Less attention is paid to the efficiency, i.e. the ratio of the work to the required fuel quantity.

However, a relatively small quantity of fuel should be consumed even when the battery is to be charged faster. When the partial torque is specified only for producing a large output power, as was the case until now, the desired function of the hybrid vehicle is undermined due to the increased fuel consumption.

SUMMARY OF THE INVENTION

It is therefore an object of the invention to provide an approach for balancing to the greatest possible extent the requirement of providing high electrical power with the generator (in particular for rapidly charging a battery) with the requirement for low fuel consumption.

The object is attained by a method for operating a vehicle with an internal combustion engine and a generator, wherein during operation of the internal combustion engine a partial torque of the torque generated by the internal combustion engine on a shaft is used to produce an electric current with the generator, and wherein the partial torque is set in a first mode so that an efficiency is adjusted to an optimum, in particular a maximum value, and is set in a second mode, so that the efficiency is adjusted to an additional value.

According to the invention, the additional value which is set to the efficiency in the second mode is derived by applying a predetermined calculation rule to the optimum value.

With the invention, the efficiency is thus initially set, with the efficiency determining the partial torque. The efficiency is determined based on a calculation rule. A functional dependence from the maximum value, which is optimized for the motor vehicle, may thus be selected.

The invention proposes a particularly simple embodiment in that the reciprocal value of the additional value for all possible load points differs by the same predetermined percentage from the reciprocal value of the optimum value (this is understood to be a deviation upward).

With such a simple calculation rule, the deviation from the efficiency can be preset. Higher power can then be supplied by the generator; but only with the proviso that the efficiency does not change above a certain level.

Suitable values are percentages between 1% and 10%, preferably between 2% and 7.5% and more preferably between 4% and 6%, which are then implemented each time after their selection. The efficiency varies only very slightly when, for example, a percentage of 5% is selected. The value of 5% may, on the other hand, be selected so that curves representing the inverse efficiency over the partial torque are very flat, whereby a very large additional partial torque can be provided, thus increasing the available power.

As already discussed above, the generator in the present invention is preferably also operated as an electric drive, and the electric current supplied by the generator may be used to charge (at least partially in relation to the provided power) a battery for the electric drive.

Preferably, the second mode is automatically implemented under predetermined operating conditions: for example, it may be desired to operate the internal combustion engine for a very short time when driving in an urban environment, in which case the battery should advantageously be charged rapidly. The motor vehicle may determine the environment in which it is located, for example, based on a positioning signal, for example by using the Global Positioning System, GPS, and a map.

BRIEF DESCRIPTION OF THE DRAWING

An embodiment of the invention will now be described with reference to the drawing which shows in FIG. 1 a schematic plan view of a hybrid vehicle in which the method according to the present invention is used, and FIG. 2 two diagrams in a coordinate system, based on which the method according to the present invention is described below.

DETAILED DESCRIPTION OF PREFERRED EMBODIMENTS

Figure 1:
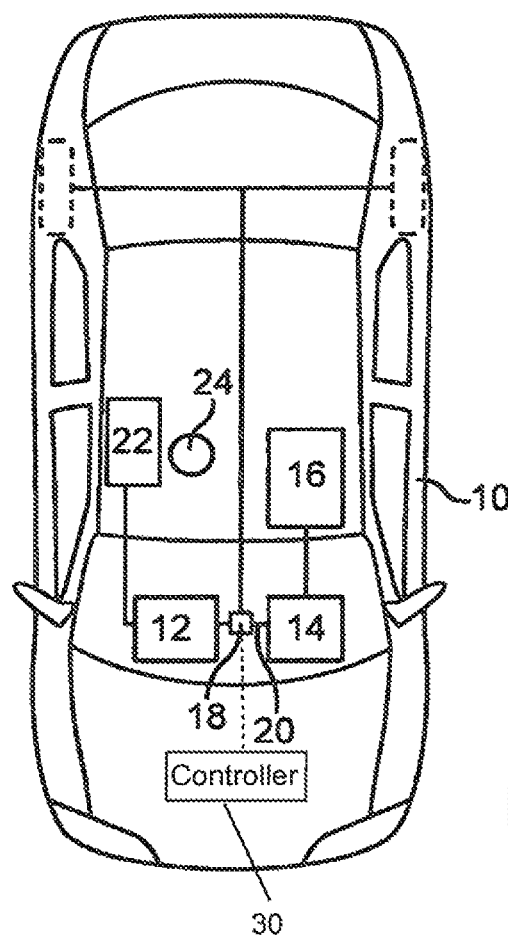
Figure 2:
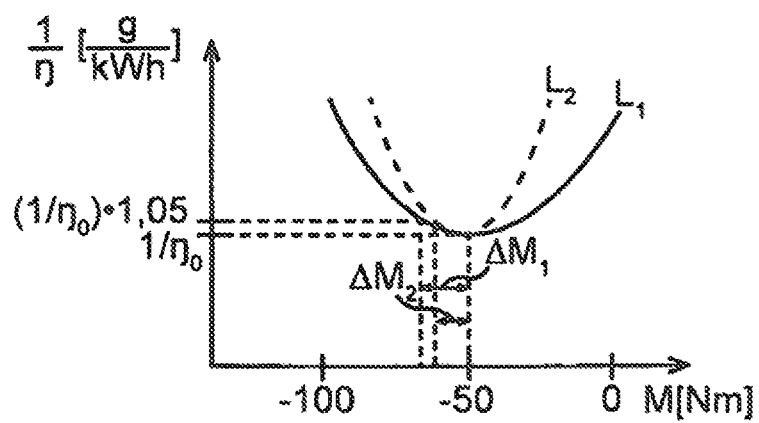

A motor vehicle designated overall with the reference symbol 10 has an internal combustion engine 12 and an electric drive 14, which can also be operated as a generator. The electric drive 14 is supplied from a battery 16. The battery 16 is charged when the electric drive 14 is operated as a generator. During charging, the so-called load point of the internal combustion engine 12 shifts: The conventional load point is determined by the torque to be applied to the wheels of the motor vehicle. A torque being used to produce electric current is now added to this torque. Thus, a portion of the torque is diverted under control of a controller 30 via a gear unit 18, another portion of the torque is supplied via a shaft 20 to the electric drive 14 which operates as a generator. A ratio of the energy provided in the battery 16 and the amount of required fuel can be determined, wherein the fuel is supplied to the internal combustion engine 12 from a fuel tank 22. This ratio is called the efficiency q. The reciprocal value $1/\eta$ is shown in FIG. 2 as a function of the torque supplied via the shaft 20. The mathematical sign of the torque is selected so that a torque generated by the electric drive 14 is positive. The values for the torque of FIG. 2 are thus generally negative, because the diagrams apply to the situation where torque is supplied to the electric drive.

FIG. 2 shows two diagrams designated with $L_1$ and $L_2$. The letter "L" stands for a load point, $L_1$ and $L_2$ correspond to different load points. These are the load points, which are determined by the torque to be applied to the wheels of the motor vehicle 10. The x-axis shows the magnitude of the load point shift. Each diagram shows how the reciprocal efficiency changes at a given load point, depending on the load point shift.

The motor vehicle 10 should now be operated, when the battery 16 is charged by the generator 14, so that the efficiency is at a maximum, meaning that the inverse efficiency is at a minimum. The maximum efficiency is $\eta_o$ and the load point shift in this example is 50 Nm.

Under certain circumstances, it may be necessary to charge the battery 16 faster, for example when driving with the engine 12 only for a short time in an urban environment, as determined with a position sensor 24 in the motor vehicle, and when the electric drive 14 is to be used after the battery 16 has been charged. In this case, a compromise is made between a less than optimal efficiency and rapid charging. A value for $1/\eta$ is explored, which is 1.05 times greater than the value $1/\eta_0$. This value then determines the difference $-\Delta M_1$, in the load point shift: The load point corresponding to a load point shift of $-50-\Delta M_1$ is thus selected. This load point shift ensures relatively rapid charging, without sacrificing a significant amount of efficiency $\eta$.

The load point shift for the second diagram $L_2$ is $-\Delta M_2$, and the aforementioned discussion likewise applies.

It is assumed in FIG. 2 that the minima in the diagrams $L_1$ and $L_2$ coincide. This need not necessarily be the case. In the present invention, the additional load point shift, i.e. the increase of the partial torque to be produced by the internal combustion engine 12, is preferably determined based on a respective minimum inverse efficiency.

The factor of 1.05, which represents an increase of 5%, may be appropriate for certain curve fields at certain load points. A different factor may prove to be suitable for other models of motor vehicles. In principle, the increase may be between 1% and 10%, corresponding to a factor between 1.01 and 1.10.

The invention claimed is:

1. A method for operating a vehicle with an internal combustion engine and a generator, said internal combustion engine producing a total torque, comprising:
   during operation of the internal combustion engine, controlling a gear unit with a controller of the vehicle to divert from the total torque a partial torque to a generator shaft,
   applying the partial torque to the generator and producing with the generator from the partial torque an electric current,
   in a first mode, setting with the controller the partial torque so that an efficiency is adjusted to an optimum value, and
   in a second mode, setting with the controller the partial torque so that the efficiency is adjusted to an additional value, wherein the additional value is determined by applying a predetermined calculation rule to the optimum value, and wherein a reciprocal value of the additional value differs from a reciprocal value of the optimum value by a predetermined percentage.

2. The method of claim 1, wherein the optimum value is a maximum value.

3. The method of claim 1, wherein the predetermined percentage is between 1% and 10%.

4. The method of claim 1, wherein the predetermined percentage is between 2% and 7.5%.

5. The method of 1, herein the predetermined percentage is between 4% and 6%.

6. The method of claim 1, wherein the generator is operated as an electric drive.

7. The method of claim 6, wherein the electric current at least partially charges a battery for the electric drive.

8. The method of claim 1, wherein the second mode is automatically implemented under predetermined operating conditions.

\* \* \* \* \*